(12) United States Patent
Yamada et al.

(10) Patent No.: US 6,327,016 B1
(45) Date of Patent: Dec. 4, 2001

(54) LCD DEVICE HAVING PIT REGION IN TOP OF PROTRUSION STRUCTURE FOR AXISYMMETRICALLY ALIGNING LIQUID CRYSTAL MOLECULES

(75) Inventors: Nobuaki Yamada, Osaka; Takashi Kurihara, Nara-ken; Masato Imai, Gifu-ken, all of (JP)

(73) Assignees: Sharp Kabushiki Kaisha, Osaka; Sony Corporation, Tokyo, both of (JP)

( * ) Notice: Subject to any disclaimer, the term of this patent is extended or adjusted under 35 U.S.C. 154(b) by 0 days.

(21) Appl. No.: 09/406,782

(22) Filed: Sep. 28, 1999

(30) Foreign Application Priority Data

Sep. 29, 1998 (JP) .................................................. 10-276141

(51) Int. Cl.$^7$ ................................................ G02F 1/1337
(52) U.S. Cl. ............................................ 349/160; 349/123
(58) Field of Search ................................. 349/156, 123, 349/130, 191, 32, 160, 129

(56) References Cited

U.S. PATENT DOCUMENTS 6,014,188 * 1/2000 Yamada et al. ........................ 349/32
6,072,557 * 6/2000 Kishimoto ............................ 349/156

FOREIGN PATENT DOCUMENTS

| 01217396 A | 8/1989 | (JP) . |
| 07120728 A | 5/1995 | (JP) . |
| 09197384 A | 7/1997 | (JP) . |
| 10186331 A | 7/1998 | (JP) . |

* cited by examiner

*Primary Examiner*—James A. Dudek
*Assistant Examiner*—Andrew Schechter
(74) *Attorney, Agent, or Firm*—Nixon & Vanderhye P.C.

(57) ABSTRACT

A liquid crystal display includes a first substrate having a substrate surface, a second substrate disposed facing the first substrate, a liquid crystal layer having liquid crystal molecules, interposed between the first and second substrates, a protrusion-like structure provided on the substrate surface facing the liquid crystal layer, and a vertical alignment layer provided on the first substrate so as to cover the protrusion-like structure. The liquid crystal layer is divided by the protrusion-like structure into a plurality of liquid crystal regions. The liquid crystal molecules have negative dielectric anisotropy and, in the presence of an applied voltage, are aligned axially symmetrically within at least one of the plurality of liquid crystal regions about an axis substantially perpendicular to the substrate surface. The protrusion-like structure includes a side wall sloped with respect to the substrate surface, and a pit region in a top portion of the protrusion-like structure.

7 Claims, 12 Drawing Sheets

Equivalent circuit

$$V_{LC} = \frac{V}{1 + C_{LC}(1/C_p + 1/C_g)}$$

$$C = \varepsilon S / d$$

$$V_{LC} = \frac{V}{1 + \frac{\varepsilon_{LC}}{d_{LC}}\left(\frac{h_p}{\varepsilon_p} + \frac{d_g}{\varepsilon_g}\right)}$$

FIG.6A

Opening 12

LCD DEVICE HAVING PIT REGION IN TOP OF PROTRUSION STRUCTURE FOR AXISYMMETRICALLY ALIGNING LIQUID CRYSTAL MOLECULES

BACKGROUND OF THE INVENTION

1. Field of the Invention

The present invention relates to a liquid crystal display device, and more particularly to a liquid crystal display device with a large screen having wide viewing angle characteristics.

2. Description of the Related Art

In the conventional technology, there has been a display device utilizing electro-optical effects, such as a twisted nematic (TN) or super twisted nematic (STN) type liquid crystal display device. Now technology has been vigorously studied such that the viewing angle of such a liquid crystal display device may be enhanced.

An example of the technology for enhancing the viewing angle is seen in a TN type liquid crystal display device in which liquid crystal molecules are axially symmetrically aligned in each of liquid crystal regions separated by a wall of polymer (protrusion-like structure), namely, a so-called Axially Symmetrically aligned Microcell (ASM) mode liquid crystal display device, as disclosed in Japanese Laid-Open Publication No. 7-120728. A liquid crystal region surrounded by the polymer wall typically corresponds to a pixel region. In the ASM mode liquid crystal display device, liquid crystal molecules are axially symmetrically aligned, so that an observer recognizes less variation in contrast in any viewing directions; that is, wide viewing angle characteristics are obtained.

A production method of such an ASM mode liquid crystal display device is disclosed in Japanese Laid-Open Publication No. 7-120728. In accordance with the method disclosed in the publication, a protrusion-like structure is formed on a substrate in a grid pattern so that liquid crystal molecules are axially symmetrically aligned by the interaction between the protrusion-like structure and the liquid crystal molecules. Japanese Laid-Open Publication No. 10-133206discloses another ASM mode liquid crystal display device in which the axially symmetrical alignment is achieved by the combination of a liquid crystal material of negative dielectric anisotropy (N-type liquid crystal material) and a vertical alignment film.

A plasma addressed liquid crystal display device has potential as a large size liquid crystal display device and thus has been vigorously developed. An example of the plasma addressed liquid crystal display device is disclosed in Japanese Laid-Open Publication No. 1-217396. The plasma addressed liquid crystal display device includes a substrate, a thin dielectric sheet, ribs disposed between the substrate and the dielectric sheet, and discharge channels (plasma channel) surrounded by the substrate, the dielectric sheet and the ribs. The discharge channels are arranged in rows. The state of plasma discharge is changed by switching a voltage applied to noble gas filled in the discharge channel using an anode electrode and a cathode electrode. Liquid crystal molecules of a liquid crystal layer are driven by a voltage applied between the discharge channel and a counter electrode, via the dielectric sheet.

In the device disclosed in Japanese Laid-Open Publication No. 1-217396, liquid crystal molecules are aligned in the same direction. Therefore, the device has a problem with its viewing angle characteristics. In order to solve this problem, Japanese Laid-Open publication Nos. 9-197384 and 10-186331 each disclose a plasma addressed liquid crystal display device of the above-described ASM mode.

However, the present inventors have found that the conventional ASM mode plasma addressed liquid crystal display device has problems described in the following numbered sections (1), (2), and (3).

(1) Reduction in transmittance

In the above-described ASM mode liquid crystal display device, when the protrusion-like structure is black, i.e., light-blocking, and formed within the pixel region, an aperture ratio is significantly reduced and thus transmittance is decreased. When the protrusion-like structure is transparent, the above-described problem does not arise. Nevertheless, as schematically illustrated in FIG. 1, a liquid crystal layer 2 has a thickness of d1 and also has a thickness of d2 directly above the protrusion-like structure 1 which is smaller than d1. A portion of the liquid crystal layer having the smaller thickness of d2 does not contribute sufficiently to display. In this case, the state of display appears the same as when the transmittance is decreased due to a reduction in the aperture ratio. This occurs for the following reason. The liquid crystal display device is designed using as a reference the thickness of d1 across the region having no protrusion-like structure 1. In the case where the thickness of d2 across the liquid crystal layer 1 directly above the protrusion-like structure 1 largely differs from d1, the retardation of such a region of the liquid crystal layer is deviated from the designed value, thus reducing the amount of light contributing to display.

(2) Less stability of an axially symmetrical alignment (at a fast response speed, or under external pressure)

Figure 1:
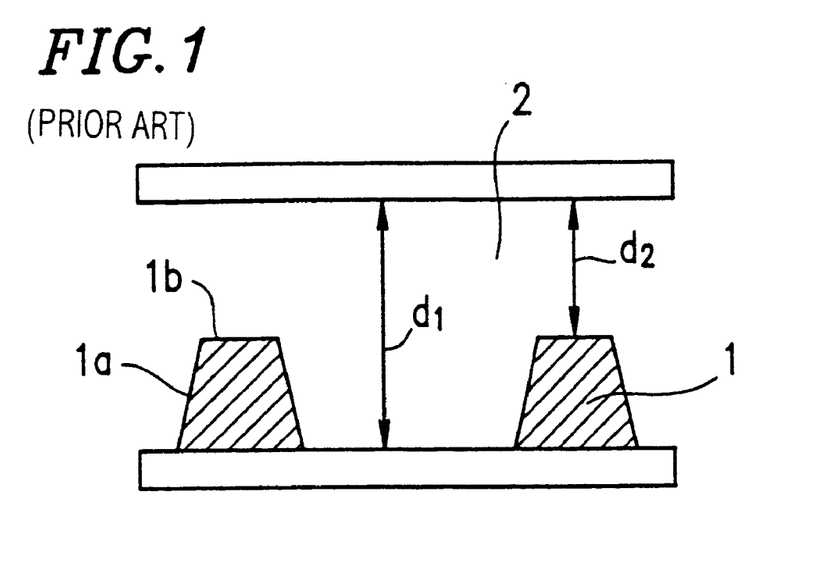
FIG. 1 is a schematic view illustrating a protrusion-like structure of a conventional ASM mode liquid crystal display device.

In the liquid crystal layer including the conventional protrusion-like structure 1, a force for regulating the alignment of liquid crystal molecules is provided by a sloped surface 1a of the protrusion-like structure 1 (see FIG. 1). Such an alignment force is hardly provided by a top surface 1b of the protrusion-like structure 1. Thus, the alignment of liquid crystal molecules is unstable in the vicinity of the top surface 1b. For example, the re-alignment of the liquid crystal molecules cannot follow a fast variation in voltage, so that the alignment state becomes irregular and thus rough display is observed.

When an external pressure is applied to a local portion of the liquid crystal cell, the less alignment force provided by the top surface 1b of the protrusion-like structure 1 cannot prevent the disturbed alignment of the liquid crystal molecules, so that the rough display is observed.

(3) Slow response speed

In a conventional plasma addressed liquid crystal display device, a voltage is applied across a liquid crystal layer and a thin dielectric sheet (e.g., a glass sheet about 50 $\mu$m thick). Therefore, the voltage applied across the liquid crystal layer largely depends on the thickness of the liquid crystal layer. When the plasma addressed liquid crystal display device incorporates the ASM mode provided by the above-described protrusion-like structure, a voltage applied across the liquid crystal layer directly above the protrusion-like structure is not sufficient because such a portion of the liquid crystal layer has a smaller thickness. Therefore, the liquid crystal layer directly above the protrusion-like structure has a significantly slow response speed, reducing the entire response speed in displaying a gray scale image.

Further, since almost no alignment forces are provided by the top surface of the protrusion-like structure as described above, the alignment of the liquid crystal molecules slowly changes from the start of application of a voltage, resulting in a slow response speed. This phenomenon will be described below with reference to FIGS. 2A through 2D.

Figure 2A:
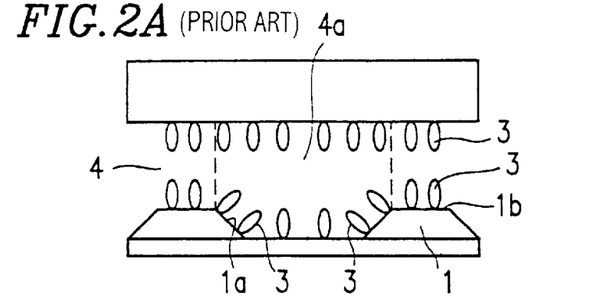
FIG. 2A is a schematic view illustrating an alignment state of liquid crystal molecules in the absence of an applied voltage in the conventional ASM mode liquid crystal display device shown in FIG. 1.
Figure 2B:
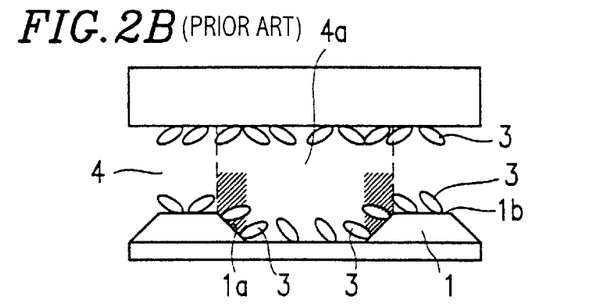
FIGS. 2B through 2D are schematic views illustrating alignment states of liquid crystal molecules in the presence of an applied voltage in the conventional ASM mode liquid crystal display device shown in FIG. 1.
Figure 2C:
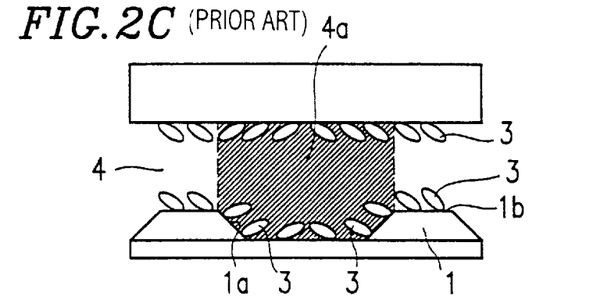
Figure 2D:
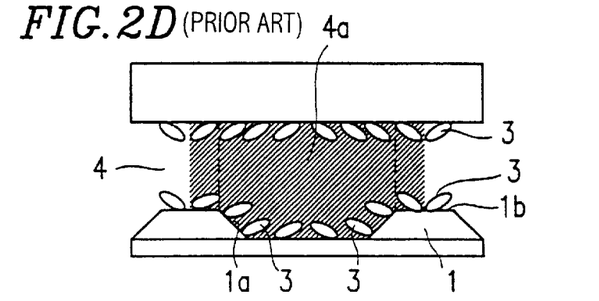

In the absence of an applied voltage as shown in FIG. 2A, liquid crystal molecules 3 are aligned substantially perpendicularly to all surfaces of a pair of substrates and a protrusion-like structure 1 facing a liquid crystal layer 4. In FIGS. 2A through 2D, a vertical alignment film is not shown for simplicity. When a voltage is applied across the liquid crystal layer 4, the liquid crystal molecules 3 first start to tilt in random directions as shown in FIG. 2B. In this case, the liquid crystal molecules 3 in the vicinity of a side wall 1a of the protrusion-like structure 1 tilt toward the inside of a region 4a (subpixel region) substantially surrounded by the protrusion-like structure 1 by an influence of the side wall 1a (see hatched portions in FIG. 2B). Then, the liquid crystal molecules 3 within the region 4a interact with the liquid crystal molecules 3 in the vicinity of the side wall 1a, and finally take an axially symmetrical alignment which is stable with respect to energy, as shown by a hatched portion in FIG. 2C. Thereafter, as shown by a hatched portion in FIG. 2D, the liquid crystal molecules 3 directly above a top surface 1b of the protrusion-like structure 1 interact with the axially symmetrically aligned liquid crystal molecules 3 within the region 4a, and thus change their alignment directions. The liquid crystal molecules 3 directly above the top surface 1b of the protrusion-like structure 1 are equally affected by the liquid crystal molecules 3 in the regions 4a surrounding the protrusion-like structure 1, and therefore are axially symmetrically aligned.

As described above, the liquid crystal molecules 3 are gradually aligned in a stepwise way, so that the response speed of the whole pixel region is slow. Also, as described above, the alignment force provided directly above the top surface 1b of the protrusion-like structure 1 is so weak that external pressure on a display panel may easily disturb the alignment, and it may take longer time to restore the disturbed alignment as compared with the liquid crystal molecules 3 in the region 4a.

Japanese Laid-Open Publication No. 7-120728 discloses a technique for stabilizing the alignment of liquid crystal molecules with a monomer to prevent the above-described phenomenon. The alignment stabilizing technique is performed in the following way: a mixture of a liquid crystal material and a photo curable monomer is injected into a cell including a pair of substrates, one of which includes a protrusion-like structure; an axially symmetrical alignment state of liquid crystal molecules is established in the presence of an applied voltage; and the monomer in the mixture is cured by ultraviolet light irradiation to form an alignment stabilizing layer which stabilizes the axially symmetrical alignment state of the liquid crystal molecules. A smaller amount of the photocurable monomer can further maintain the vertical alignment in the absence of an applied voltage. However, the use of this method leads to an increase in cost since the formation of the alignment stabilizing layer is an extra step.

SUMMARY OF THE INVENTION

A liquid crystal display device according to the present invention includes a first substrate having a substrate surface, a second substrate disposed facing the first substrate, a liquid crystal layer having liquid crystal molecules, interposed between the first and second substrates, a protrusion-like structure provided on the substrate surface facing the liquid crystal layer, and a vertical alignment layer provided on the first substrate so as to cover the protrusion-like structure. The liquid crystal layer is divided by the protrusion-like structure into a plurality of liquid crystal regions, The liquid crystal molecules have negative dielectric anisotropy and, in the presence of an applied voltage, are aligned axially symmetrically within at least one of the plurality of liquid crystal regions about an axis substantially perpendicular to the substrate surface. The protrusion-like structure includes a side wall sloped with respect to the substrate surface, and a pit region in a top portion of the protrusion-like structure.

In one embodiment of the invention, a depth of the pit region is smaller than a height of the protrusion-like structure.

In one embodiment of the invention, the pit region has a side wall sloped with respect to the surface of the first substrate at a slope angle of about 45° or less.

In one embodiment of the invention, the protrusion-like structure has a grid pattern.

In one embodiment of the invention, the protrusion-like structure has a checkered pattern.

In one embodiment of the invention, the second substrate is a plasma cell including a plate, a dielectric sheet, ribs interposed between the plate and the dielectric sheet, and plasma channels surrounded by the plate, the dielectric sheet and the ribs. The discharge channels are arranged in rows.

Hereinafter, functions of the present invention will be described.

The protrusion-like structure of the liquid crystal display device according to the present invention divides the liquid crystal layer into a plurality of liquid crystal regions. The liquid crystal molecules in the liquid crystal region have negative dielectric anisotropy, and therefore are aligned perpendicularly with respect to the substrate surface in the absence of an applied voltage due to the alignment force of the vertical alignment film. The protrusion-like structure has a side wall sloped with respect to the substrate surface and thereby causes the liquid crystal molecules to be axially symmetrically aligned about an axis perpendicular to the substrate surface in the presence of an applied voltage. Moreover, the protrusion-like structure according to the present invention has a pit in the top portion thereof. The pit has an alignment force that axially symmetrically aligns the liquid crystal molecules directly above the top of the protrusion-like structure. Therefore, a portion of the liquid crystal layer directly above the protrusion-like structure which is not effectively used in the conventional ASM mode liquid crystal display device becomes available for display, resulting in an improvement in the transmittance of the liquid crystal display device.

Even when the depth of the pit region is smaller than the height of the protrusion-like structure, by forming the side wall of the pit region in a way to be continuous (i.e., have a larger area), the alignment force can be enhanced. When the side wall of the pit region is sloped with respect to the surface of the substrate and its slope angle is about 45° or less, the liquid crystal molecules are axially symmetrically aligned more efficiently.

When the protrusion-like structure has a grid pattern, the liquid crystal region, of which liquid crystal molecules are axially symmetrically aligned, can be easily formed in register with the pixel region. Even when the pitch of the liquid crystal region is small, a reduction in the transmittance can be avoided by providing a protrusion-like structure having a checkered pattern.

The ASM mode plasma addressed liquid crystal display device according to the present invention can improve the transmittance, the response speed, and the stability of the alignment as compared with the conventional technology.

Thus, the invention described herein makes possible the advantages of providing an ASM mode liquid crystal display device having a stable axially symmetrical alignment, a high degree of transmittance, and a fast response speed.

These and other advantages of the present invention will become apparent to those skilled in the art upon reading and understanding the following detailed description with reference to the accompanying figures.

DESCRIPTION OF THE PREFERRED EMBODIMENTS

The present inventors have found that, as described above, a problem with the conventional ASM mode liquid crystal display device arises because the top surface $1b$ of the protrusion-like structure 1 (typically formed as a polymer wall) as shown in FIGS. 2A through 2D does not have a sufficient alignment force. An ASM mode liquid crystal display device according to the present invention includes a pair of substrates, a liquid crystal layer interposed between the substrates, a protrusion-like structure provided on a surface facing the liquid crystal layer of at least one substrate, where a top portion of the protrusion-like structure includes a pit region. For example, in the case of a plasma addressed liquid crystal display device, the protrusion-like structure may be formed on a thin dielectric sheet included in a plasma cell, or the substrate facing the dielectric sheet. A structure and features of the liquid crystal display device of the present invention will be described in greater detail below.

(Alignment Effect Due to a Pit Region in a Top Portion of a Protrusion-like Structure)

Figure 3:
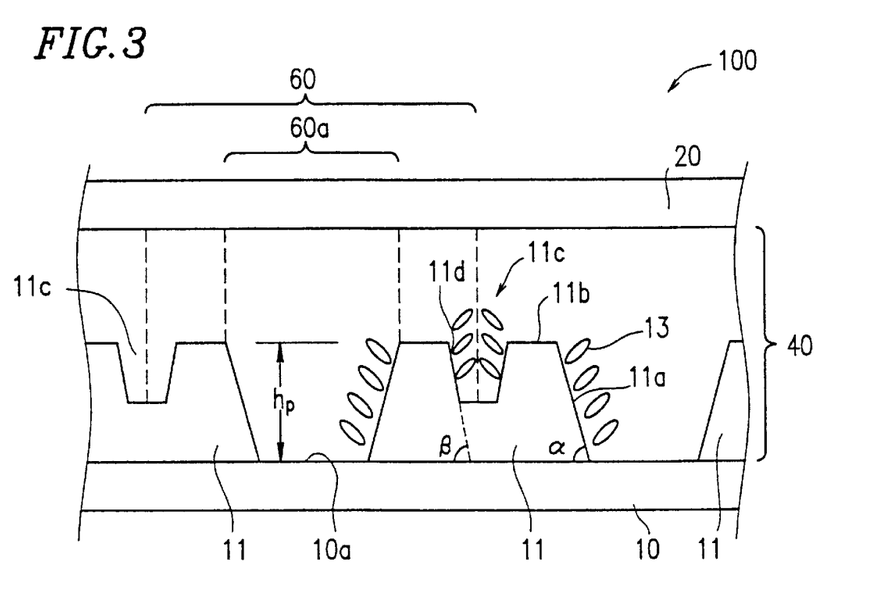
FIG. 3 is a schematic view illustrating an alignment regulation of liquid crystal molecules in a liquid crystal display device according to the present invention.

FIG. 3 illustrates a liquid crystal display device 100 according to the present invention. The liquid crystal display device 100 includes first and second substrates 10 and 20, and a protrusion-like structure 11 having a height of $h_p$ provided on the first substrate 10. The protrusion-like structure 11 includes a side wall 11$a$ having a slope angle of $\alpha$ with respect to a surface 10$a$ of the first substrate 10 (hereinafter referred to as a substrate surface loa), and a pit region 11$c$ in a top portion 11$b$ thereof. The pit region 11$c$ includes a side wall 11$d$ having a slope angle of $\beta$ with respect to the substrate surface 10$a$. A liquid crystal layer 40 is interposed between the first and second substrates 10 and 20. The liquid crystal layer 40 is divided by the protrusion-like structure 11 into a plurality of liquid crystal regions 60 including subregions 60$a$ (subpixel regions). Each subregion 60$a$ is surrounded by the protrusion-like structure 11.

A liquid crystal layer 40 including liquid crystal molecules 13 is disposed between the first and second substrates 10 and 20. When a voltage is applied across the liquid crystal layer 40, the liquid crystal molecules 13 on the side wall 11$a$ of the protrusion-like structure 11 tilt toward a direction parallel to the substrate surface 10$a$. Subsequently, in the same way as described with reference to FIGS. 2B and 2C, the liquid crystal molecules in the subregion 60$a$ are axially symmetrically aligned about an axis perpendicular to the substrate surface 10$a$. The liquid crystal molecules 13 on the side wall 11$d$ of the pit region 11$c$ also tilt toward a direction parallel to the substrate surface 10$a$ (i.e., inward toward the pit region 11$c$). The side wall 11$d$ of the pit region 11$c$ is more effective on the alignment regulation when it is sloped than when it is directed perpendicularly to the substrate surface 10$a$. The slope angle $\beta$ is preferably about 45° or less. It is because when the side wall 11$d$ is vertical, the liquid crystal molecules 13 on the side wall 11$d$ are substantially oriented in a direction parallel to the substrate surface 10$a$ in the absence of an applied voltage, so that an applied voltage cause substantially no change in the tilt of the liquid crystal molecules 13 on the side wall 11$d$. In this case, therefore, the effect of tilting the liquid crystal molecules 13 toward a direction parallel to the substrate surface 10$a$ is smaller than when the side wall 11$d$ is sloped.

The slope angle a is preferably in the range of about 3° to about 45°. When the slope angle a exceeds about 45°, a change in the orientation of the liquid crystal molecules 13 due to an applied voltage (a change in a tilt angle) becomes excessively small, so that the side wall 11$a$ has an insufficient alignment effect. In this case, the liquid crystal molecules in the subregion 60$a$ substantially surrounded by the protrusion-like structure 11 are not axially symmetrically aligned, resulting in rough display.

Figure 4A:
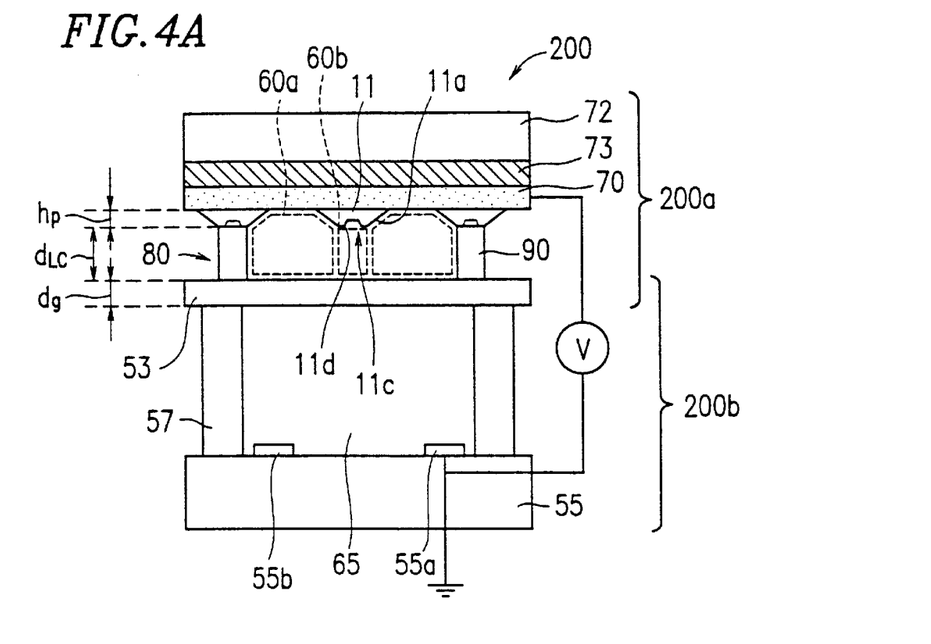
FIG. 4A is a cross-sectional view illustrating a plasma addressed liquid crystal display device according to the present invention.

The alignment effect provided by the pit region 11c of the protrusion-like structure 11 according to the present invention is particularly significant in a plasma addressed liquid crystal display device. FIG. 4A illustrates a plasma addressed liquid crystal display device 200 of the present invention incorporating the protrusion-like structure having the pit region.

The plasma addressed liquid crystal display device 200 shown in FIG. 4A has a flat panel structure including a display cell 200a for modulating incident light into outgoing light according to a pixel signal and performing display, and a plasma cell 200b for selectively driving (addressing) the pixel region. The display cell 200a and the plasma cell 200b share a dielectric sheet 53.

The plasma cell 200b includes a glass plate 55, the dielectric sheet 53, ribs 57, and discharge channels 65. The discharge channels 65 are arranged in rows, each of which is surrounded by the plate 55, the dielectric sheet 53, and the ribs 57. The display cell 200a is scanned by the discharge channels 65 successively generating plasma discharge row by row. The discharge channel 65 has a space accommodating an anode electrode 55a and a cathode electrode 55b. Naturally, a power supplying circuit for applying a voltage between the anode electrode 55a and the cathode electrode 55b in order to generate plasma discharge, a scanning circuit for controlling the scanning, and the like are provided, though not shown. Components necessary for driving the plasma addressed liquid crystal display device 200 may be the same as those used in the conventional plasma addressed liquid crystal display devices.

The display cell 200a includes signal electrodes 70 which are substantially perpendicular to the discharge channels 65. The signal electrodes 70 are arranged in columns. The pixel regions are defined at intersections of the signal electrodes 70 and the discharge channels 65. When a voltage applied between the anode electrode 55a and the cathode electrode 55b generates plasma discharge, the electric potential at a surface of the dielectric sheet 53 facing a liquid crystal layer 80 is equal to the electric potential of the anode electrode 55a. As a result, a voltage (data signal or video signal) is applied across the dielectric sheet 53 and the liquid crystal layer 80. The plasma discharge is generated in one discharge channel after another, i.e., row by row. A liquid crystal layer 80 at the pixel region where the discharge channel 65 and the signal electrode 70 intersect performs display by a voltage applied by the signal electrode 70 being synchronized with a voltage applied by the discharge channel 65.

The plasma cell 200b is formed by bonding an assembly of the glass plate 55, the ribs 57, the anode electrode 55a and the cathode electrode 55b to a lower surface of the dielectric sheet 53. The display cell 200a is formed by bonding an assembly of the glass plate 72, the color filter layer 73, the signal electrodes 70, a protrusion-like structure 11 and a column-like structure 90 to an upper surface of the dielectric sheet 53. The thickness of the liquid crystal layer 80 (i.e., a cell gap) is defined by the heights of the protrusion-like structure 11 and the column-like structure 90 disposed on a portion of the protrusion-structure 11. The column-like structure 90 is disposed directly below a black matrix (not shown) of the color filter layer 73. The signal electrode may be alternatively formed on the protrusion-like structure 11. Vertical alignment films (not shown) are formed on the surfaces facing the liquid crystal layer 80, of the dielectric sheet 53 and the glass plate 72 so as to cover the signal electrode 70, the protrusion-like structure 11, and the column-like structure 90.

In the plasma addressed liquid crystal display device according to the present invention, the height $h_p$ of the protrusion-like structure 11 is particularly a key factor for the characteristics of display. How a voltage $V_{LC}$ across the liquid crystal layer 80 directly above the protrusion-like structure 11 varies as the height $h_p$ of the protrusion-like structure 11 is lowered, will be described below with reference to FIGS. 4A and 4B.

Figure 4B:
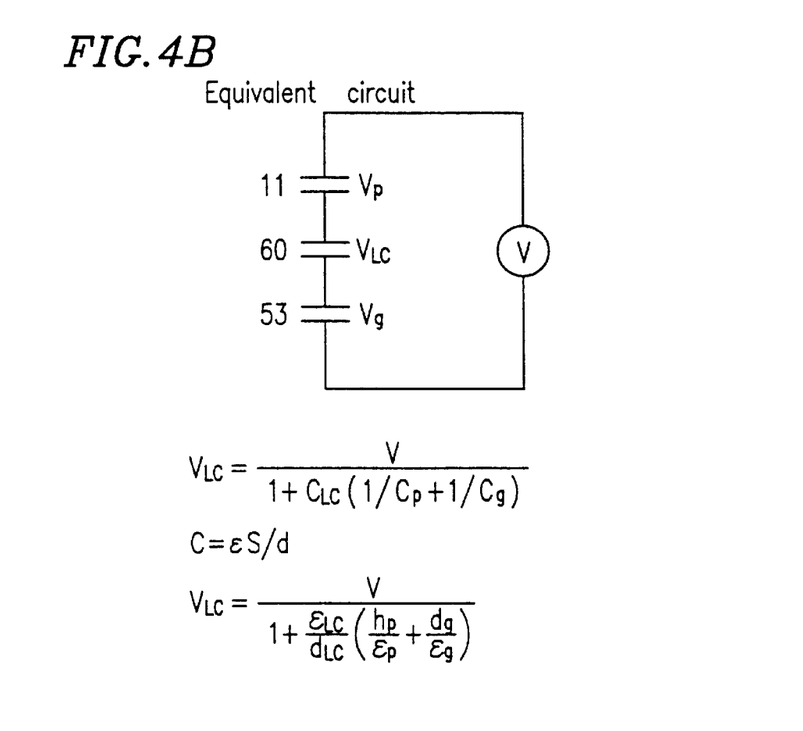
FIG. 4B is a diagram illustrating an equivalent circuit of the plasma liquid crystal display device shown in FIG. 4A.
Figure 5:
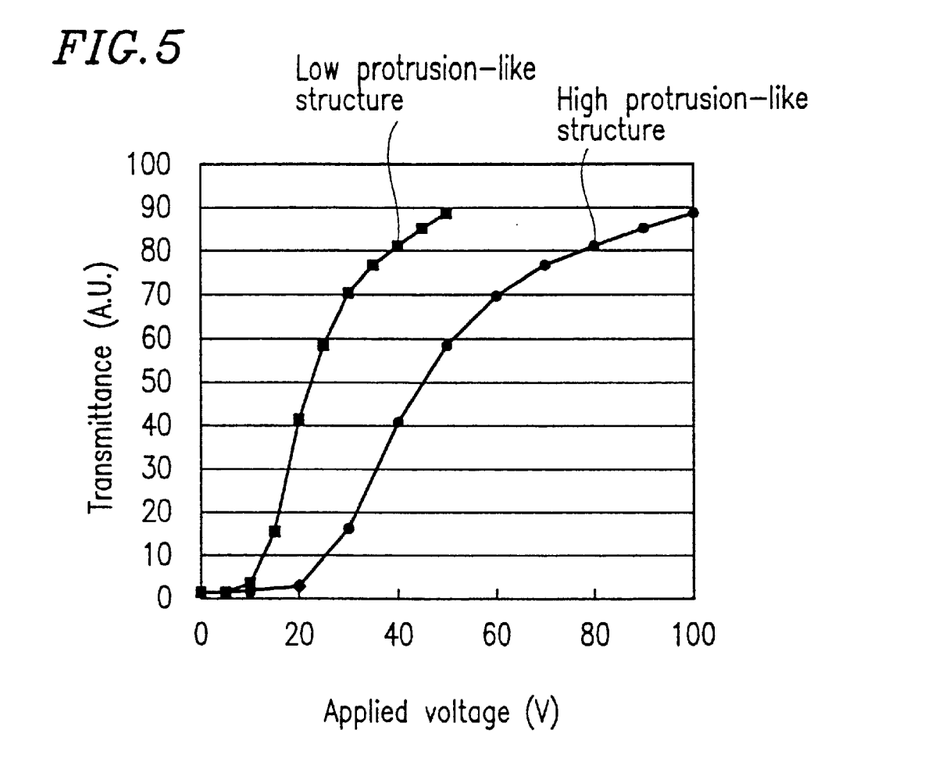
FIG. 5 is a graph showing the voltage-transmittance characteristics of a plasma liquid crystal layer of the liquid crystal display device shown in FIG. 4A.

In FIGS. 4A and 4B, $\epsilon_{LC}$, $\epsilon_p$ and $\epsilon_g$ indicate the dielectric constants of the liquid crystal layer 80 directly above the protrusion-like structure 11, the protrusion-like structure 11 and the dielectric sheet 53, respectively; and $d_{LC}$, $h_p$ and $d_g$ indicate the thickness of the liquid crystal layer 80 directly above the protrusion-like structure 11, the height of the protrusion-like structure 11 and the thickness of the dielectric sheet 53, respectively. The dielectric constant is inherent for each material. As the height $h_p$ of the protrusion-like structure 11 is lowered, the thickness $d_{LC}$ is correspondingly increased and therefore a voltage across the liquid crystal layer 80 directly above the protrusion-like structure 11 becomes large. The smaller is the height $h_p$ of the protrusion-like structure 11, the closer the voltage across a second subregion 60b of the liquid crystal layer 80 directly above the protrusion-like structure 11 is to the voltage across a first subregion 60a (subpixel region) surrounded by the protrusion-like structure 11. As shown in FIG. 5, in the plasma addressed liquid crystal display device, the liquid crystal molecules are driven by a smaller voltage when the height of the protrusion-like structure 11 is smaller (indicated by ■) as compared to when the height of the protrusion-like structure 11 is larger (indicated by ●).

Returning to FIG. 4A, in the plasma addressed liquid crystal display device according to the present invention, the protrusion-like structure 11 includes a pit region 11c in a top portion thereof. Since the liquid crystal layer 80 directly above the pit region 11c has a greater cell gap, the liquid crystal molecules within the pit region 11c of the protrusion-like structure 11 change their alignment in response to a relatively low voltage. Thus, the liquid crystal molecules directly above the top surface 11b of the protrusion-like structure 11 can contribute to display.

The above-described effect is also advantageous in the response speed of the liquid crystal molecules in a gray scale display. A liquid crystal display device using a nematic liquid crystal material has generally a slow response speed for displaying a gray scale image and poses a problem that a fast moving picture cannot be satisfactorily displayed. In contrast, in the plasma addressed liquid crystal display device according to the present invention, the liquid crystal molecules in the second subregion 60b including the pit region 11c are driven at a voltage close to a voltage applied across the first subregion 60a, so that the liquid crystal molecules within the first and second subregions 60a and 60b operate substantially simultaneously. Therefore, an apparent response speed is fast in displaying a gray scale image.

(Pit Region)

Figure 6A:
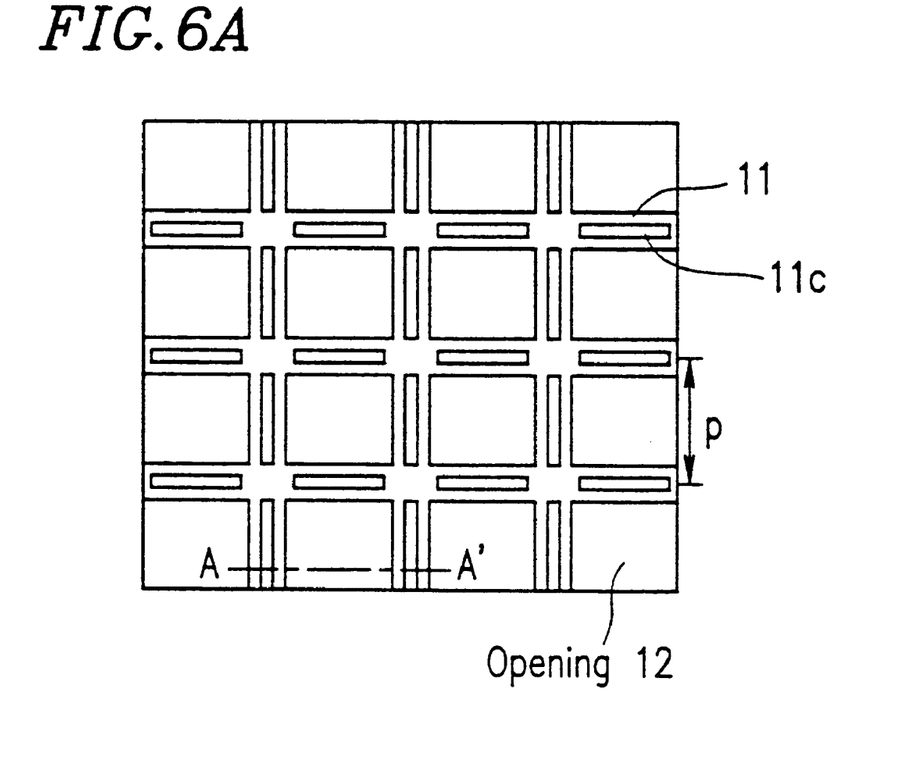
FIG. 6A a schematic view illustrating an exemplary two-dimensional arrangement of a protrusion-like structure according to the present invention.
Figure 6B:
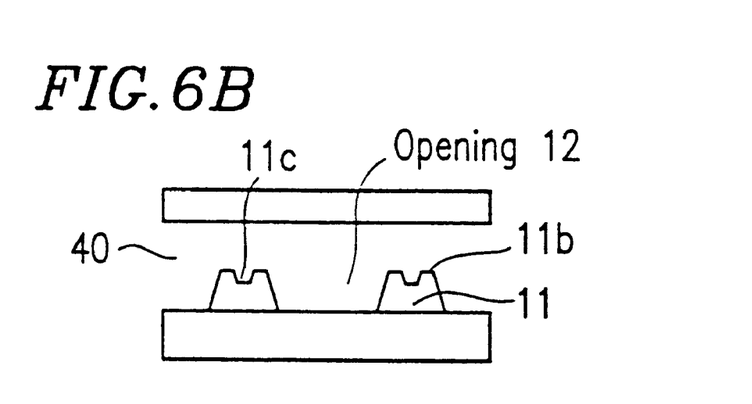
FIG. 6B is a cross-sectional view of the protrusion-like structure shown in FIG. 6A taken along line A–A'.
Figure 7A:
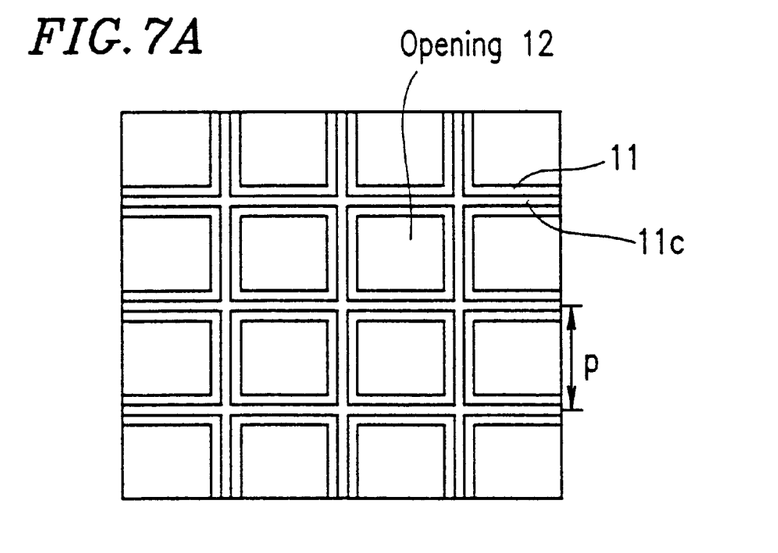
FIGS. 7A and 7B are schematic views illustrating exemplary two-dimensional arrangements of a protrusion-like structure according to the present invention.

FIG. 6A illustrates an example of a two-dimensional arrangement of the pit region 11, and FIG. 6B illustrates a cross-sectional view taken along line A–A' thereof. As will be seen from FIG. 6A, the protrusion-like structure 11 has a grid pattern, and the pit region 11c is formed in a top portion 11b of the protrusion-like structure 11 in such a manner that hollows out a part of the top portion 11b. The four side walls of the pit region have alignment forces applied to the liquid crystal molecules which are then axially symmetrically aligned. Such a pit region may be produced by hollowing out a portion of the protrusion-like structure either continuously (as shown in FIG. 7A) or discontinuously (as shown in FIG.

Figure 7B:
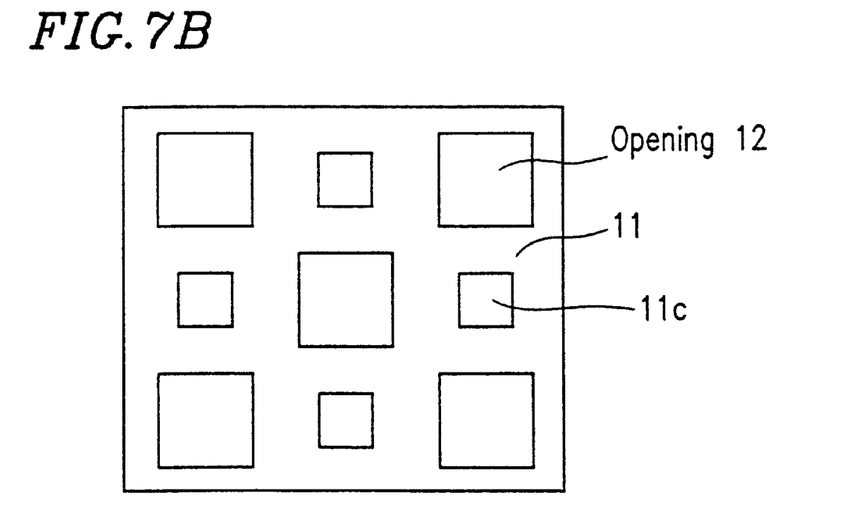

6A). The protrusion-like structure 11 is typically formed with a photolithography technique. However, a photomask has a poor resolution. Therefore, when a pitch P of the grid pattern of the protrusion-like structure 11 is small, the protrusion-like structure 11 has a larger area than openings 12 (surrounded by the protrusion-like structure 11) as viewed in a direction normal to a substrate surface. In this case, referring to FIGS. 6A and 6B, regions of the liquid crystal layer 40 having smaller thicknesses occupy a large proportion of the entire liquid crystal layer 40, resulting in a reduction in transmittance. In such a structure having a small pitch, the protrusion-like structure is preferably arranged two-dimensionally in a checkered pattern as shown in FIG. 7B. Such a checkered pattern is effective in the present invention. The pit region 11c can be formed in the protrusion-like structure 11 having the checkered pattern. The pit region lie in the top portion 11b of the protrusion-like structure 11 enlarges the proportion of regions of the liquid crystal layer 40 (see FIG. 6B) having larger thicknesses, thereby making it possible to prevent a reduction in transmittance.

According to the present invention, even when the protrusion-like structure 11 is provided in the pixel region, the transmittance is not largely reduced. With this advantage, in a liquid crystal display device having large pixel regions, the protrusion-like structure 11 can be formed in the large pixel region so that a plurality of axially symmetrical alignment regions may be provided in one pixel region and nevertheless the transmittance is not reduced. Preferably, the divided regions in the pixel region are in the shape of a rectangle so that the pitch of the protrusion-like structure 11 fits the pitch of the discharge channel. When the pitch of the protrusion-like structure 11 is out of register with the pitch of the discharge channel, a periodic variation in the transmittance (moiréfringe) occurs. The pit region 11c having pits of different sizes may be provided.

Figure 8A:
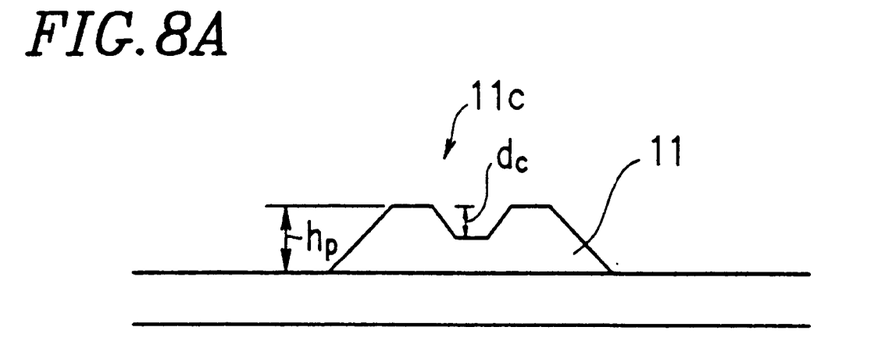
FIGS. 8A and 8B are schematic cross-sectional views of a protrusion-like structure according to the present invention.
Figure 8B:
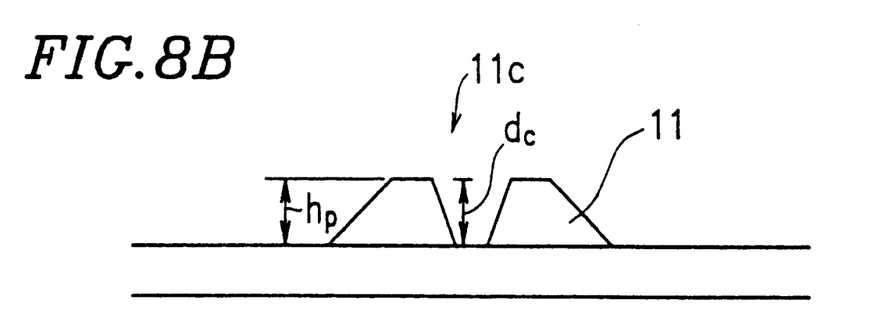

Referring to FIG. 3, the side wall 11d of the pit region 11c is, as described above, preferably sloped, having a slope angle β in the range of about 5° to about 70°, more preferably 45°, instead of being perpendicular, with respect to the substrate surface. When the slope angle β is smaller than about 5°, it may not be possible to control the alignment of the liquid crystal molecules. When the slope angle β exceeds about 70°, the pit region 11c is required to be deeper in order that a sufficient alignment force can be obtained. Referring to FIGS. 8A and 8B, the depth $d_o$ of the pit region 11c is not necessarily required to be equal to the height $h_p$ of the protrusion-like structure 11 (FIG. 8B), but may be smaller than the height $h_p$ (FIG. 8A). When the depth da of the pit region is smaller than the height $h_p$ of the protrusion-like structure 11, the alignment force can be enhanced by forming the side wall 11d of the pit region 11c so as to be continuous (have a larger area).

Referring to FIG. 3, a transparent signal electrode (not shown) for applying a voltage across the liquid crystal layer 40 may be formed on a surface of the protrusion-like structure 11 or between the protrusion-like structure 11 and the first substrate 10. When the transparent electrode is provided between the protrusion-like structure 11 and the first substrate 10, a voltage is applied across the liquid crystal layer 40 via the protrusion-like structure 11, which requires a higher driving voltage. In this case, the protrusion-like structure 11 having a smaller height is preferable. Specifically, the height of the protrusion-like structure 11 is preferably in the range of about 0.3 μm to about 2 μm. When the height is smaller than about 0.3 μm, it is difficult to control the height and thus a protrusion-like structure having a uniform height cannot be produced, which causes irregularity of display. For the transparent electrode, a material which is used in a typical liquid crystal display device, such as indium tin oxide (ITO) and tin oxide, is usable.

A vertical alignment film is preferably formed on the transparent electrode in a way to cover the protrusion-like structure 11 including the pit region 11c. A material for the vertical alignment film is, for example, polyimide (e.g., JALS-204 produced by Japan Synthetic Rubber Co., Ltd.).

(Method for Producing a Pit Region)

Figure 9A:
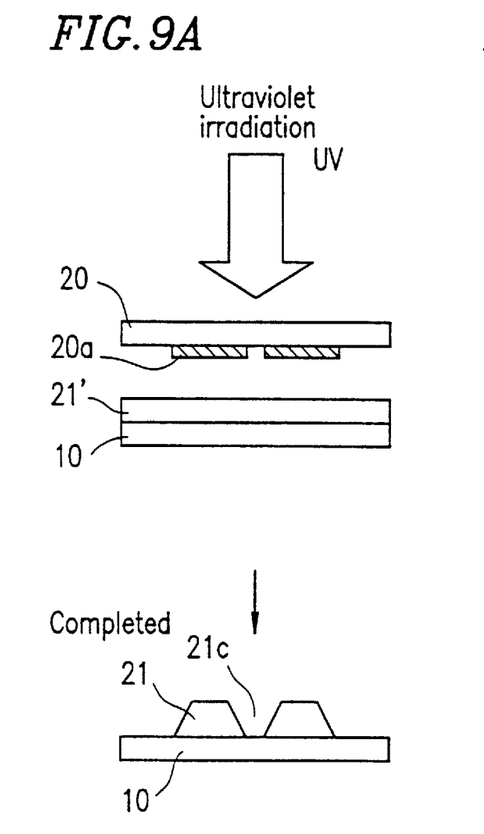
FIGS. 9A and 9B are schematic views each showing an exemplary method for producing a protrusion-like structure according to the present invention.
Figure 9B:
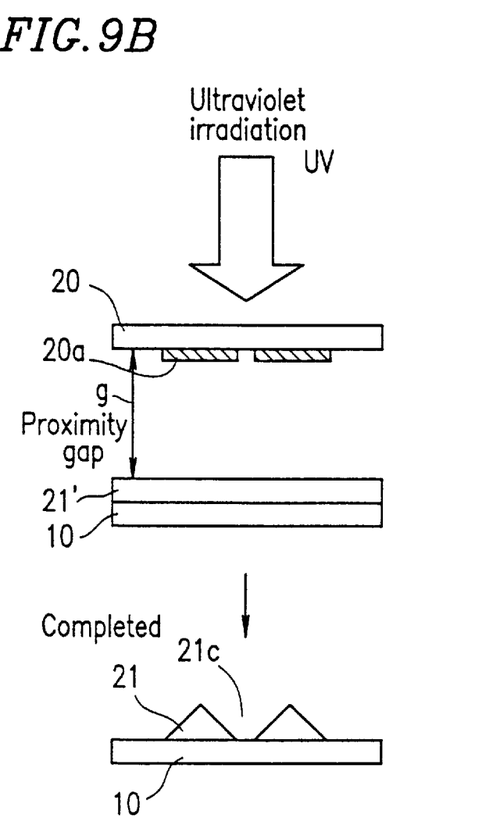

A production method of a pit region preferably employs a photolithography technique using a resist material. Referring to FIGS. 9A and 9B, production methods of a pit region 21c having a side wall will be described. As shown in FIG. 9B, the pit region 21 is produced by making a large distance g (proximity gap) between a photomask 20 and a resist layer 21' on a first substrate 10. Alternatively, as shown in FIG. 9A, the pit region 21c is produced by making a small interstice (corresponding to the pit region 21c) between masking parts 20a of a photomask 20 such that an image cannot be clearly resolved (when a positive resist is used). The pit region 21 may be produced by overdevelopment.

(Stabilization of Axially Symmetrical Alignment)

The stability of the axially symmetrical alignment generated in the presence of an applied voltage is dependent on the size of the liquid crystal region substantially surrounded by the protrusion-like structure. Even when the axially symmetrical alignment of the liquid crystal molecules is once established, the alignment may be disturbed by an external pressure or the like. To avoid such a disturbance and stabilize the alignment of the liquid crystal molecules, a polymer stabilizing technique can be adopted using a photocurable monomer. Specifically, the alignment of the liquid crystal molecules can be stabilized by forming an alignment stabilizing layer of a polymer in the following way: a mixture of a liquid crystal material and a photocurable monomer is injected into a cell gap between two substrates of a cell, at least one of which has a pit region thereon; the axially symmetrical alignment state of liquid crystal molecules is established in the presence of a predetermined applied voltage; and the monomer in the mixture is cured by ultraviolet light irradiation. An appropriately smaller amount of the photocurable monomer can maintain the vertical alignment in the absence of an applied voltage.

An example of the liquid crystal material is an N-type liquid crystal material ($\Delta\epsilon=-4.0$, $\Delta n=0.08$, optionally a chiral dopant is added). Examples of the photocurable monomer include acrylates, methacrylates, styrenes, and derivatives thereof.

EXAMPLE 1

In Example 1, a plasma addressed liquid crystal display device according to the present invention was produced having the same structure as that of the plasma addressed liquid crystal display device 200 shown in FIG. 4A. A protrusion-like structure 31 according to Example 1 will be described with reference to FIGS. 10A and 10B.

Figure 10A:
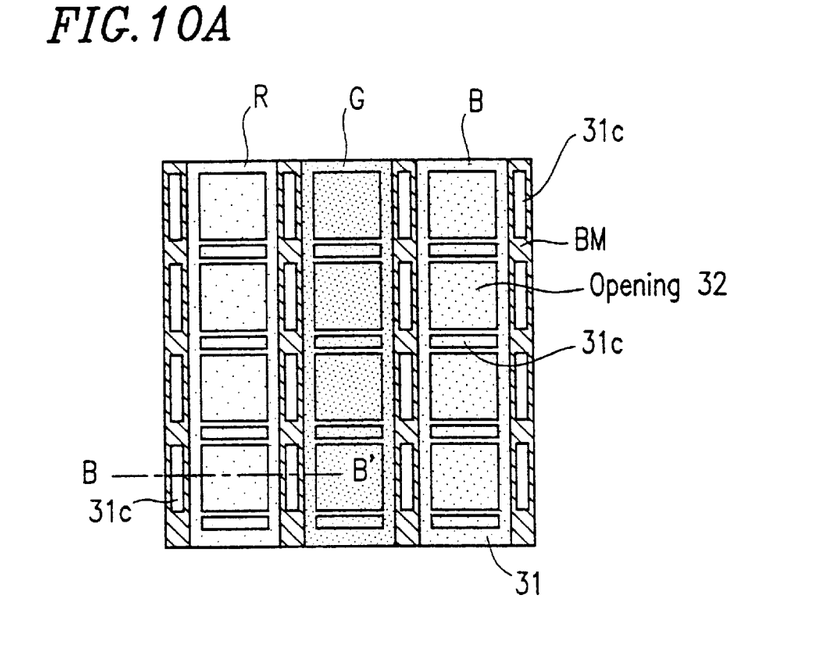
FIG. 10A is a top view illustrating a protrusion-like structure according to Example 1 of the present invention.
Figure 10B:
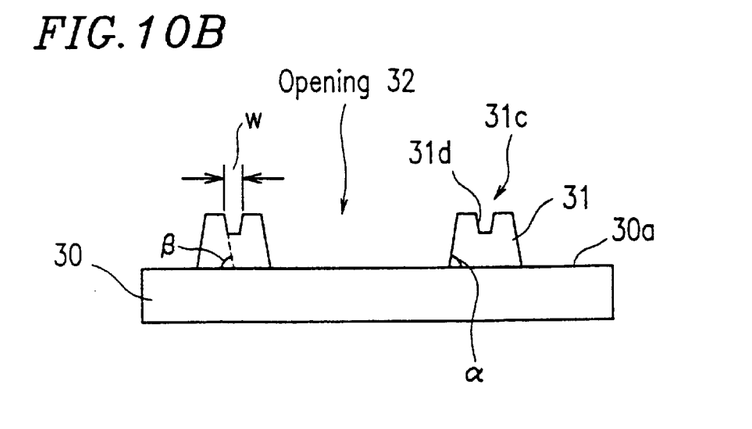
FIG. 10B is a cross-sectional view illustrating the protrusion-like structure shown in FIG. 10A taken along line B–B'.

FIG. 10A is a top view illustrating a two-dimensional arrangement of a liquid crystal display device according to Example 1 of the present invention. FIG. 10B is a cross-sectional view of the liquid crystal display device taken along line B–B'.

The protrusion-like structure 31 was produced on a substrate 30 including a color filter layer (having R, G, B, and black matrix regions) using a photolithography technique. The protrusion-like structure 31 was about 1.0 μm high, a side wall 31d of which had a slope angle of about 30° with respect to a substrate surface 30a. The pit region 31c was provided each having a width w of about 10 μm and a depth of about 0.5 μm. A side wall 31d of the pit region 31c had a slope angle β of about 20° with respect to the substrate surface 30a. The size of a pixel region was about 140 μm×about 140 μm. An indium tin oxide (ITO) layer to be a transparent electrode was formed on the substrate 30 by sputtering so as to cover the substrate 30 and the protrusion-like structure 31. The ITO layer was divided into a plurality of transparent electrodes (not shown) by etching so that the transparent electrodes each have the same width as that of the pixel region. A column-like structure (not shown) having a height of about 5 μm was discretely formed on the black matrix regions of the color filter layer. The column-like structure serves as spacers. Accordingly, the cell gap (the thickness of the liquid crystal layer) was about 6 μm at an opening 32 (i.e., a subpixel region) surrounded by the protrusion-like structure 31. The substrate 30, the protrusion-like structure 31, and the transparent electrodes were coated with a vertical alignment film.

The resultant assembly is combined with a plasma cell (not shown) having a similar structure to the plasma cell 200b (FIG. 4A).

A mixture of a liquid crystal material of negative dielectric anisotropy (Δε=−4.0, Δn=0.08) and a photocurable monomer having the following Formula was injected into a cell gap between the substrate 30 and the plasma cell. As a photo initiator, Irgacure 184 (produced by Chiba-Geigy Corporation) was used. Thus, a plasma addressed liquid crystal display was completed.

(polymer stabilizing technique), the axially symmetrical alignment can be stabilized when a pitch of the protrusion-like structure 41 is about 60 μm or less, preferably about 30 μm or less. In such a arrangement, an alignment force from the protrusion-like structure 41 is sufficiently strong to be spread throughout the entire liquid crystal layer, and thus the axially symmetrical alignment can be stabilized without a monomer. In practice, when the liquid crystal display device was operated by fast switching, the liquid crystal molecules changed their alignment directions sufficiently fast, thereby obtaining satisfactory display.

Comparative Example

In the Comparative example, a protrusion-like structure having a height of about 3 μm without a pit region was formed in a grid pattern on the same substrate as that in Example 1. A transparent electrode is formed on the substrate so as to cover the protrusion-like structure. A column-like structure having a height of about 3 μm is then formed on the transparent electrode, which serves as spacers. A liquid crystal material mixed with a monomer is used as in Example 1. Except the above points, the plasma addressed liquid crystal display device is the same as that of Example 1. The characteristics of the plasma addressed liquid crystal display device of the Comparative example are shown in the Table as well as those of Examples 1 and 2.

[Formula]

Figure 11:
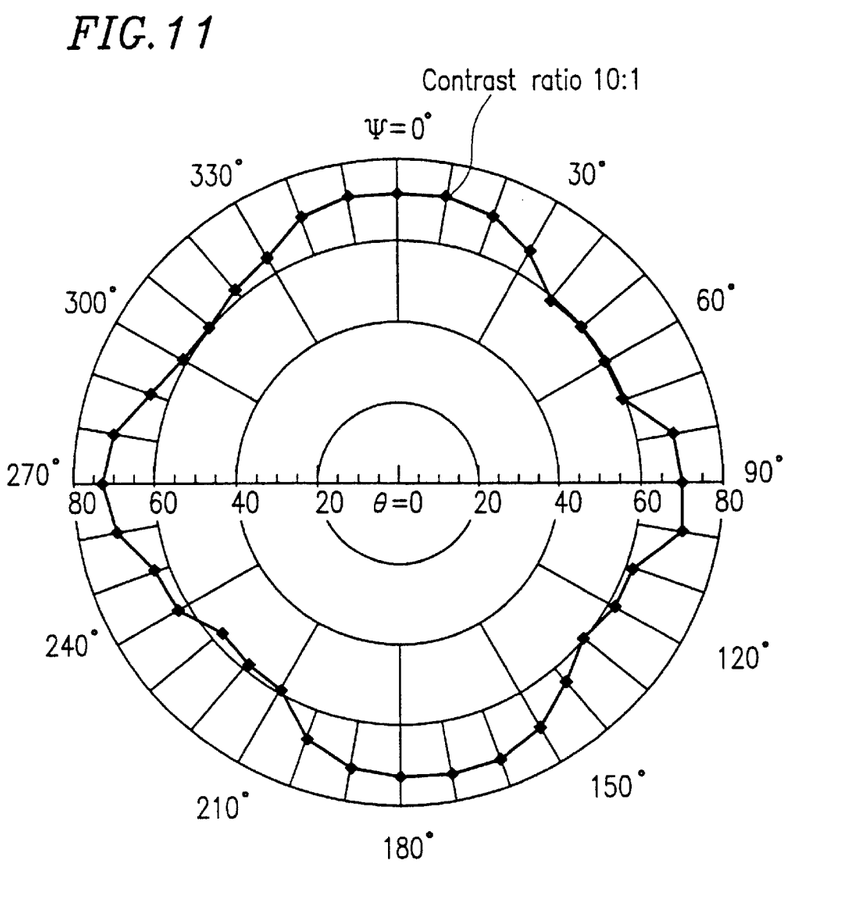
FIG. 11 is an isocontrast locus diagram illustrating viewing angle characteristics of an ASM mode plasma addressed liquid crystal display device according to Example 1 of the present invention.

When a voltage was applied across the plasma cell, the axially symmetrical alignment was observed by a polarization-microscope. Particularly, an axially symmetrical alignment was generated on the protrusion-like structure 31 (including within the pit region 31c). The viewing angle characteristics of the resultant liquid crystal display device is shown in FIG. 11. As will be seen from FIG. 11, the 10:1 contrast ratio angular viewing positions are distributed at viewing angles (θ) of about 60° in almost all azimuth directions (ψ).

EXAMPLE 2

Figure 12:
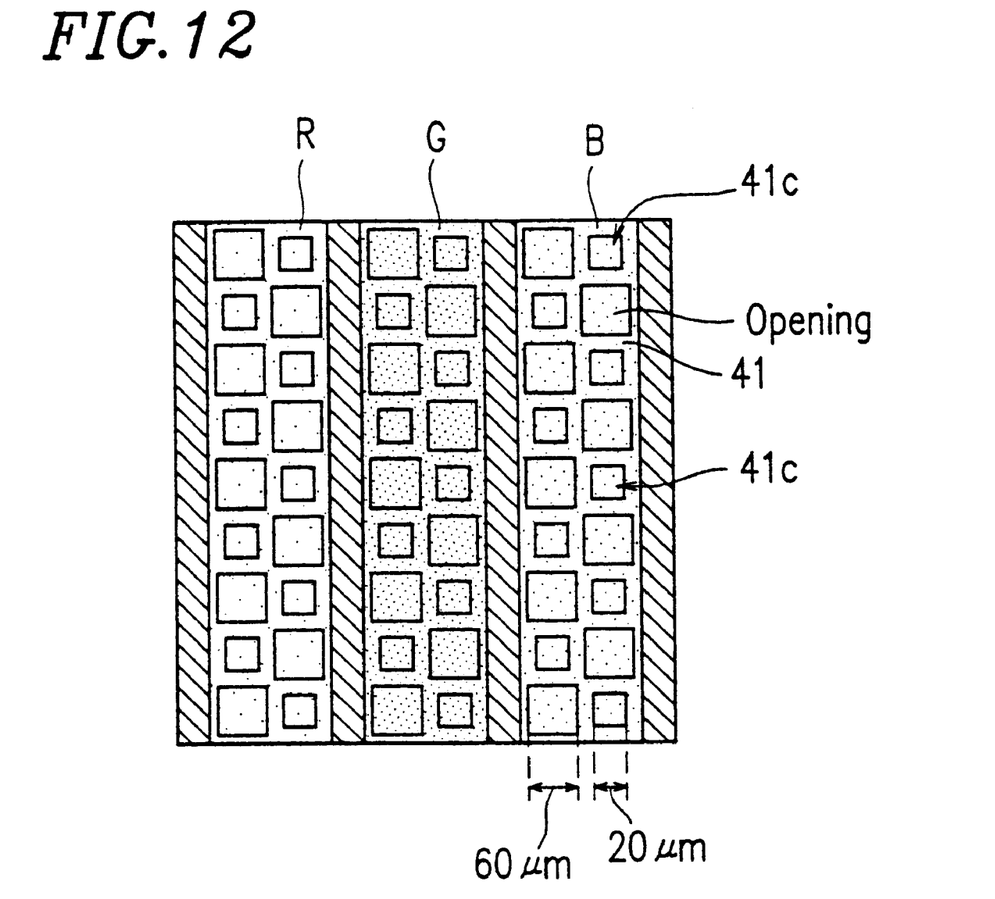
FIG. 12 is a view illustrating a two-dimensional arrangement of a protrusion-like structure according to Example 2 of the present invention.

In Example 2 of the present invention, as illustrated in FIG. 12, a protrusion-like structure had a checkered pattern. A liquid crystal material was used with no addition of a monomer. Except the above points, a plasma addressed liquid crystal display device in Example 2 was the same as that of Example 1.

In the plasma addressed liquid crystal display device according to Example 2 of the present invention, the axially symmetrical alignment was achieved directly above a protrusion-like structure 41 in the presence of an applied voltage. Wide viewing characteristics are obtained as in Example 1. Without a technique for stabilizing the alignment of the liquid crystal molecules using a monomer

TABLE

| Item | Example 1 | Example 2 | Comparative example |
|---|---|---|---|
| Transmittance ratio at 80 V | 1.08 | — | 1 |
| Response time for 0 → 80 V | 55 ms | 58 ms | 54 ms |

As shown in the Table, the transmittance in the liquid crystal display device of the Comparative example is lower than the liquid crystal display device of Example 1 since the liquid crystal molecules on the protrusion-like structure do not sufficiently respond to an applied voltage. In Examples 1 and 2, the pit region is formed in the top portion of the protrusion-like structure and therefore a sufficient voltage is supplied across the liquid crystal layer directly above the protrusion-like structure. Therefore, the transmittance in the liquid crystal layer directly above the protrusion-like structure is quickly increased at a relatively low voltage, so that the transmittance of the entire liquid crystal layer is improved. The device of Example 2 can obtain as fast a response time as that of Example 1, even though the alignment stabilization effect due to a polymer is not utilized.

In Examples 1 and 2, the present invention is applied to the plasma addressed liquid crystal display device. The present invention is also applicable to an active matrix liquid crystal display device or a simple matrix liquid crystal display device.

As described above, in the liquid crystal display device according to the present invention, the protrusion-like structure includes the pit region which has such an alignment force that axially symmetrically aligns liquid crystal molecules directly above the top portion of the protrusion-like structure. A portion of the liquid crystal layer directly above a protrusion-like structure which is not effective in display in a conventional ASM mode liquid crystal display device is available for display in the liquid crystal display device of the present invention, thereby improving the transmittance and the response speed. Furthermore, the stability of the axially symmetrical alignment is sufficiently superior, whereby the axially symmetrical alignment can be stable even when an external force is exerted on the device or fast switching is performed.

The liquid crystal display device of the present invention has superior viewing angle characteristics and thus is suitable for a large size liquid crystal display device, particularly for a plasma addressed liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first substrate having a substrate surface;
   a second substrate disposed facing the first substrate;
   a liquid crystal layer having liquid crystal molecules, interposed between the first and second substrates;
   a protrusion-like structure provided on the substrate surface facing the liquid crystal layer; and
   a vertical aligmnent layer provided on the first substrate so as to cover the protrusion-like structure;
   wherein:
      the liquid crystal layer is divided by the protrusion-like structure into a plurality of liquid crystal regions including subregions each of which is surrounded by the protrusion like structure;
      the liquid crystal molecules have negative dielectric anisotropy and, in the presence of an applied voltage, are aligned axially symmetrically within at least one of the plurality of liquid crystal regions about an axis substantially perpendicular to the substrate surface; and
      the protrusion-like structure includes a side wall sloped with respect to the substrate surface, and a pit region in a top portion of the protrusion-like structure, wherein the pit region is located at a boundary of at least one of the liquid crystal regions.

2. A liquid crystal display device according to claim 1, wherein the pit region has a side wall sloped with respect to the surface of the first substrate at a slope angle of about 45° or less.

3. A liquid crystal display device according to claim 1, wherein the protrusion-like structure has a grid pattern.

4. A liquid crystal display device according to claim 1, wherein the second substrate is a plasma cell including a plate, a dielectric sheet, ribs interposed between the plate and the dielectric sheet, and plasma channels surrounded by the plate, the dielectric sheet and the ribs; and wherein the discharge channels are arranged in rows.

5. A liquid crystal display device, comprising:
   a first substrate having a substrate surface;
   a second substrate disposed facing the first substrate;
   a liquid crystal layer having liquid crystal molecules, interposed between the first and second substrates;
   a protrusion-like structure provided on the substrate surface facing the liquid crystal layer; and
   a vertical alignment layer provided on the first substrate so as to cover the protrusion-like structure;
   wherein:
      the liquid crystal layer is divided by the protrusion-like structure into a plurality of liquid crystal regions;
      the liquid crystal molecules have negative dielectric anisotropy and, in the presence of an applied voltage, are aligned axially symmetrically within at least one of the plurality of liquid crystal regions about an axis substantially perpendicular to the substrate surface;
      the protrusion-like structure includes a side wall sloped with respect to the substrate surface, and a pit region in a top portion of the protrusion-like structure; and
      wherein a depth of the pit region is smaller than a height of the protrusion like structure.

6. A liquid crystal display device, comprising:
   a first substrate having a substrate surface;
   a second substrate disposed facing the first substrate;
   a liquid crystal layer having liquid crystal molecules, interposed between the first and second substrates;
   a protrusion-like structure provided on the substrate surface facing the liquid crystal layer; and
   a vertical alignment layer provided on the first substrate so as to cover the protrusion-like structure;
   wherein:
      the liquid crystal layer is divided by the protrusion-like structure into a plurality of liquid crystal regions;
      the liquid crystal molecules have negative dielectric anisotropy and, in the presence of an applied voltage, are aligned axially symmetrically within at least one of the plurality of liquid crystal regions about an axis substantially perpendicular to the substrate surface;
      the protrusion-like structure includes a side wall sloped with respect to the substrate surface, and a pit region in a top portion of the protrusion-like structure; and
      wherein the protrusion-like structure comprises a checkered pattern.

7. A liquid crystal display device, comprising:
   a liquid crystal layer located between first and second substrates;
   a protrusion-like structure supported by one of the substrates so as to face the liquid crystal layer;
   wherein the liquid crystal layer is divided by the protrusion-like structure into a plurality of liquid crystal regions; and
   wherein the protrusion-like structure includes a side wall sloped with respect to the substrate surface, and a pit region in a top portion of the protrusion-like structure, wherein the pit region is at least partially located at a boundary of at least one of the liquid crystal regions.

* * * * *